US009589155B2

(12) United States Patent
Poornachandran et al.

(10) Patent No.: US 9,589,155 B2
(45) Date of Patent: Mar. 7, 2017

(54) TECHNOLOGIES FOR VERIFYING COMPONENTS

(71) Applicant: Intel Corporation, Santa Clara, CA (US)

(72) Inventors: Rajesh Poornachandran, Portland, OR (US); Vincent J. Zimmer, Federal Way, WA (US); Shahrokh Shahidzadeh, Portland, OR (US); Gopinatth Selvaraje, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/493,786

(22) Filed: Sep. 23, 2014

(65) Prior Publication Data

US 2016/0085995 A1    Mar. 24, 2016

(51) Int. Cl.
 G06F 21/73    (2013.01)
 G06F 21/55    (2013.01)

(52) U.S. Cl.
 CPC .............. *G06F 21/73* (2013.01); *G06F 21/55* (2013.01)

(58) Field of Classification Search
 None
 See application file for complete search history.

(56) References Cited

U.S. PATENT DOCUMENTS

2003/0126423 A1* 7/2003 Moody, II .......................... 713/2
2007/0057956 A1* 3/2007 Gimpl et al. ................. 345/553
2008/0117028 A1* 5/2008 Karstens .................... 340/10.51
2010/0082961 A1* 4/2010 Gurumoorthy et al. .......... 713/2
2014/0208105 A1* 7/2014 Carapelli ....................... 713/168
2015/0199204 A1* 7/2015 Bieswanger et al. .......... 713/189
2015/0256333 A1* 9/2015 Hashimoto ........... H04L 9/0816
                                                                    713/168

FOREIGN PATENT DOCUMENTS

TW          201241667          10/2012

OTHER PUBLICATIONS

"Monza Tag Chip Family," http://www.impinj.com/products/monza, printed Oct. 31, 2014, 4 pages.

(Continued)

*Primary Examiner* — Benjamin Lanier
(74) *Attorney, Agent, or Firm* — Barnes & Thornburg LLP

(57) ABSTRACT

Technologies for verifying hardware components of a computing device include retrieving platform identification data of the computing device, wherein the platform identification data is indicative of one or more reference hardware components of the computing device, accessing hardware component identification data from one or more dual-headed identification devices of the computing device, and comparing the platform identification data to the hardware component identification data to determine whether a hardware component of the computing device has been modified. Each of the one or more dual-headed identification devices is secured to a corresponding hardware component of the computing device, includes identification data indicative of an identity of the corresponding hardware component of the computing device, and is capable of wired and wireless communication.

25 Claims, 5 Drawing Sheets

(56) References Cited

OTHER PUBLICATIONS

"Burnside Digital teams with Intel, Impinj, and TSL on RFID project," Burnside Digital Blog, http://blogs.burnsidedigital.com/2014/04/burnside-digital-teams-with-intel-and-tsl-on-rfid-project, printed Oct. 31, 2014, 3 pages.
Inserra, Davie, et al., "Cyber Supply Chain Security: A Crucial Step Toward U.S. Security, Prosperity, and Freedom in Cyberspace," The Heritage Foundation, Backgrounder, No. 2880, Mar. 6, 2014, 8 pages.
Office Action, Search Report, and English Translation for Taiwan Patent Appication No. 104126702, dated Aug. 30, 2016, 15 pages.

\* cited by examiner

TECHNOLOGIES FOR VERIFYING COMPONENTS

BACKGROUND

Supply chain management encounters significant challenges related to the integrity of computing devices, particularly with respect to those devices manufactured internationally. For example, a domestic original equipment manufacturer (OEM) may design a particular system, but the components may be procured, manufactured, and/or assembled into the designed system in large factories overseas, (e.g., by an original device manufacturer (ODM)). At various points in a traditional supply chain, the components to be used in the system may be swapped for inferior and/or malicious components. For example, a component required by the design specification may be exchanged by an ODM during the manufacturing process for a counterfeit inferior component to save costs associated with the manufacture of the system. Alternatively, the ODM may replace a component with another component having an overt flaw that may be exploited for malicious purposes (e.g., dual-ported memory, a network interface card with a back-channel interface, etc.).

Accordingly, there are numerous concerns with regard to the provenance of the components included in the manufactured system. Those concerns may be further magnified in circumstances in which multiple ODMs and/or other contractors are utilized for the manufacture of the system. For example, various components of the system may be manufactured in China, United States, and Japan and the system may be partially assembled in mainland China prior to being shipped to Brazil, where the assembly process may be completed. As such, if a counterfeit component is identified, it may even be difficult to identify the point in the manufacturing supply chain at which the fraud occurred. Additionally, in some cases, various components may be removed from a computing device and replaced by inferior components after the device leaves the supply chain (e.g., by a customer prior to returning a product for a refund).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
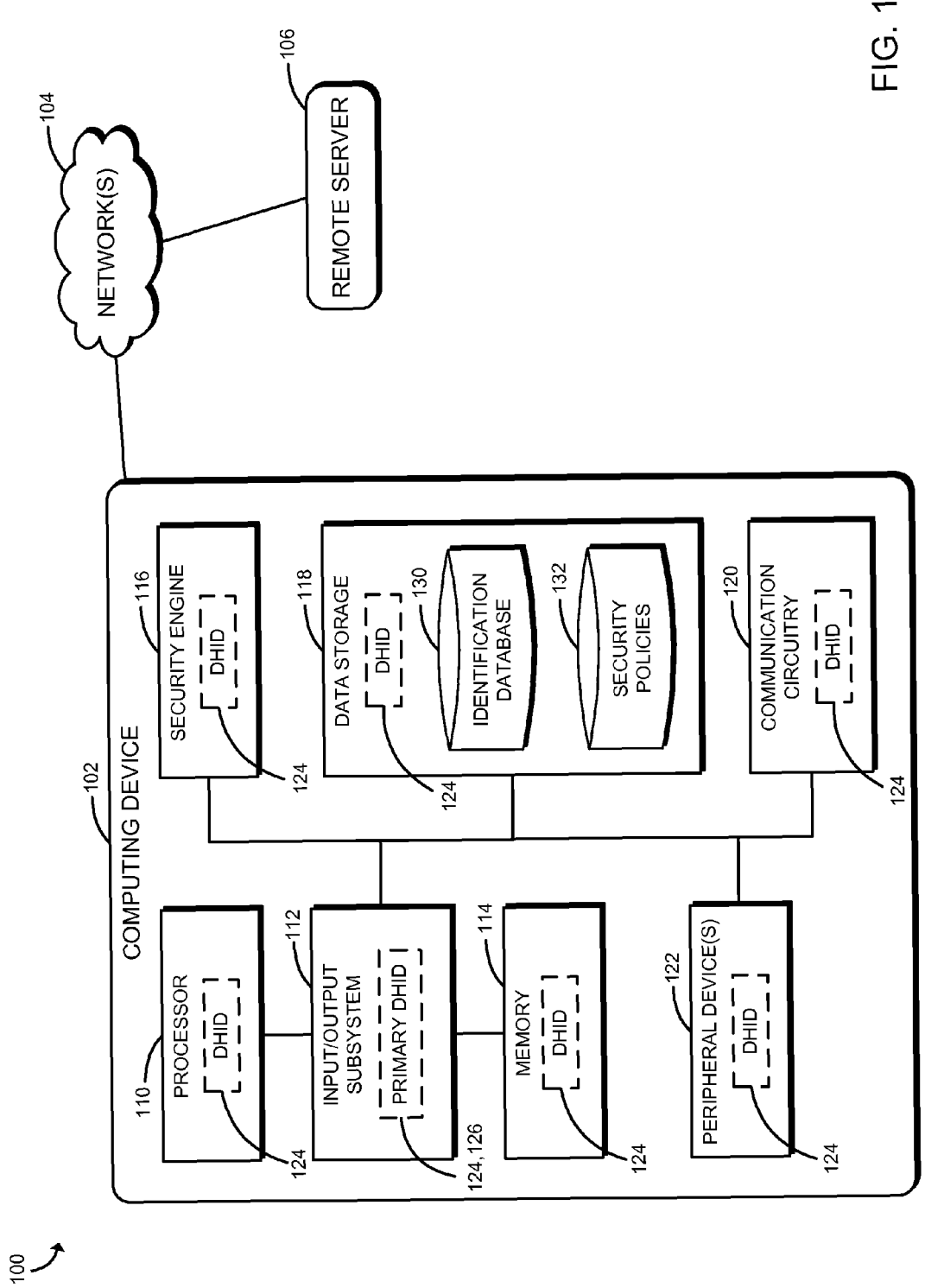
FIG. 1 is a simplified block diagram of at least one embodiment of a system for verifying platform components of a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for verifying platform components of a computing device 102 includes the computing device 102, a network 104, and a remote server 106. As described in detail below, in use, the computing device 102 includes a dual-headed identification device secured to one or more hardware components of the computing device 102. Each of the dual-headed identification devices may include identification data indicative of the corresponding hardware component to which it is secured. For example, a dual-headed identification device may be secured to a particular memory module and may include identification data indicating a type, model, serial number, manufacturer, and/or other identification information of that particular memory module. The dual-headed identification devices or their corresponding identification data may be bound together to identify the dual-headed identification devices as a set or collection (e.g., with component set identification data). As such, at boot time, the computing device 102 may retrieve the identification data of the dual-headed identification devices and compare the data to reference platform identification data that identifies the hardware components that are expected to be included the computing device 102 (e.g., according to the original design of the platform). Similarly, the remote server 106 may retrieve the data (e.g., using radio frequency (RF) communication or another wireless communication technology) for a similar comparison. It should be appreciated that the techniques described herein permit the system 100 to securely monitor the provenance of the computing device 102 locally and/or remotely. As such, the system 100 can ensure, for example, that there are no counterfeit components in the computing device 102 (i.e., no components were replaced with inferior or unsecure components).

The computing device 102 may be embodied as any type of computing device capable of performing the functions described herein. For example, the computing device 102 may be embodied as a desktop computer, server, router, switch, laptop computer, tablet computer, notebook, netbook, Ultrabook™, cellular phone, smartphone, wearable computing device, personal digital assistant, mobile Internet device, Hybrid device, gateway, and/or any other computing/communication device. As shown in FIG. 1, the illustrative computing device 102 includes a processor 110, an input/output ("I/O") subsystem 112, a memory 114, a security engine 116, a data storage 118, a communication circuitry 120, and one or more peripheral devices 122. Additionally, as shown, one or more components of the computing device 102 may include a dual-headed identification device (DHID) 124. Further, one of the DHIDs 124 may be embodied as a primary DHID 126 as described below. Of course, the computing device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the mobile computing device 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The security engine 116 may be embodied as any hardware component(s) or circuitry capable of performing cryptographic functions and/or establishing a trusted execution environment. For example, in some embodiments, the security engine 116 may be embodied as a security co-processor, such as a trusted platform module (TPM), or an out-of-band processor. Additionally, in some embodiments, the security engine 116 may establish an out-of-band communication link with remote devices.

The data storage 118 may be embodied as any type of device or devices configured for short-term or long-term storage of data such as, for example, memory devices and circuits, memory cards, hard disk drives, solid-state drives, or other data storage devices. As shown in FIG. 1, the data storage 118 of the computing device 102 includes an identification database 130 and one or more security policies 132. In the illustrative embodiment, the identification database 130 includes platform identification data indicative of one or more reference hardware components of the computing device 102. For example, the platform identification data may identify the hardware components that are supposed to be included on a particular computing device 102 (e.g., of the particular make, model, serial number, etc. of that computing device 102). In such a way, original equipment manufacturers may provide data indicating which components are supposed to be included on the computing device 102 for a particular computing device 102, which may be used to determine whether one or more components of the computing device 102 has been modified as described below. For example, in an illustrative embodiment, an Apple Macbook Pro® would have different reference/platform identification data than an Asus Zenbook® because those devices have different hardware components. It should be appreciated that the identification database 130 may be embodied as any suitable data structure configured to perform the functions described herein. For example, the identification database 130 may include searchable tables for multiple platform configurations. The security policies 132 identify various conditions and security actions to be taken in response to the conditions. For example, the security policies 132 may indicate that the computing device 102 is to prevent the operating system of the computing device 102 from booting if the computing device 102 determines that one of the components has been modified. Of course, the security policies 132 may identify other suitable actions and/or conditions as well.

Although the identification database 130 and the security policies 132 are included in the data storage 118 in the illustrative embodiment, the identification database 130 and/or the security policies 132 may be stored elsewhere on the computing device 102 in other embodiments. Further, in some embodiments, the identification database 130 and/or the security policies 132 may be stored remotely and accessible to the computing device 102 and/or the remote server 106. The data storage 118 and/or the memory 114 may store various data during operation of the computing device 102 such as, for example, cryptographic keys and/or other data useful in the operation of the computing device 102 as discussed below.

The communication circuitry 120 of the computing device 102 may be embodied as any communication circuitry, device, or collection thereof, capable of enabling communications between the computing device 102 and other remote devices (e.g., the remote server 106). The communication circuitry 120 may be configured to use any one or more communication technology (e.g., wireless or wired communications) and associated protocols (e.g., Ethernet, Bluetooth®, Wi-Fi®, WiMAX, etc.) to effect such communication.

The peripheral devices 122 may include any number of additional peripheral or interface devices, such as speakers, microphones, additional storage devices, and so forth. The particular devices included in the peripheral devices 122 may depend on, for example, the type and/or intended use of the computing device 102.

As shown in FIG. 1 and indicated above, one or more components of the computing device 102 may include a dual-headed identification device (DHID) 124. As such, a DHID 124 may be secured to one or more of the components of the computing device 102. It should be appreciated that a DHID 124 may be secured to a particular component with glue, welds, solder, electrical connections, tape, integral formation, mechanical coupling, and/or by virtue of another suitable mechanism. In some embodiments, each of the separable components of the computing device 102 includes a DHID 124. Such separable components may include, for example, dual in-line memory modules (DIMMs), network interface card (NIC) modules, processors, wireless network interface card (WNIC) modules, or any other hardware component that is capable of being separated from the computer device 102. In the illustrative embodiment, one or more of the DHIDs 124 (e.g., each DHID 124) includes dual communication modalities that enable the DHID 124 to communicate using both wired and wireless technologies. For example, the DHIDs 124 may be configured to communicate both electrically and wirelessly (e.g., via RF communication). In some embodiments, the DHIDs 124 may communicate electrically when the computing device 102 or the corresponding hardware component is powered by the computing device 102 and wirelessly otherwise (e.g., when the computing device 102 and/or the corresponding component is unpowered or in a low-powered state).

In some embodiments, one or more of the DHIDs 124 may be embodied as, or otherwise include, RFID devices (e.g., including non-volatile RAM and/or other memory). For example, the DHIDs 124 may be embodied as Wireless Credential Exchange (WCE) Monza® X UHF RFID chips in some embodiments. In the illustrative embodiment, each of the DHIDs 124 is configured to store identification data, description data, and/or constraint data associated with the corresponding component (i.e., the component to which it is secured). For example, Further, in the illustrative embodiment, one of the DHIDs 124 may be embodied as a primary DHID 126 that is configured to retrieve identification data from each of the other DHIDs 124 (e.g., the secondary DHIDs 124) and digitally bind those components to the computing device 102. To do so, the primary DHID 126 may generate component set identification data that associates the identification data of one or more (e.g., all) of the DHIDs 124 with the computing device 102. Although the primary DHID 126 is shown as being secured to, or otherwise form a part of, the I/O subsystem 112, the primary DHID 126 may be secured to, or otherwise form a part of, another component of the computing device 102 in other embodiments. In some embodiments, the primary DHID 126 may be a DHID 124 different from those identifying the components of the computing device 102 or another type of component entirely. For example, in some embodiments, the primary DHID 126 may be embodied as an independent SoC. For ease of discussion, the primary DHID 126 is primarily referred to as a DHID 124; however, the techniques described herein apply equally to embodiments in which the primary DHID 126 is alternatively embodied as a SoC or other independent component. Although the DHIDs 124, 126 are described herein as having dual communication modalities, in some embodiments, each of the DHIDs 124, 126 may have only a single communication modality (e.g., RF communication) or may have multiple communication modalities.

Figure 2:
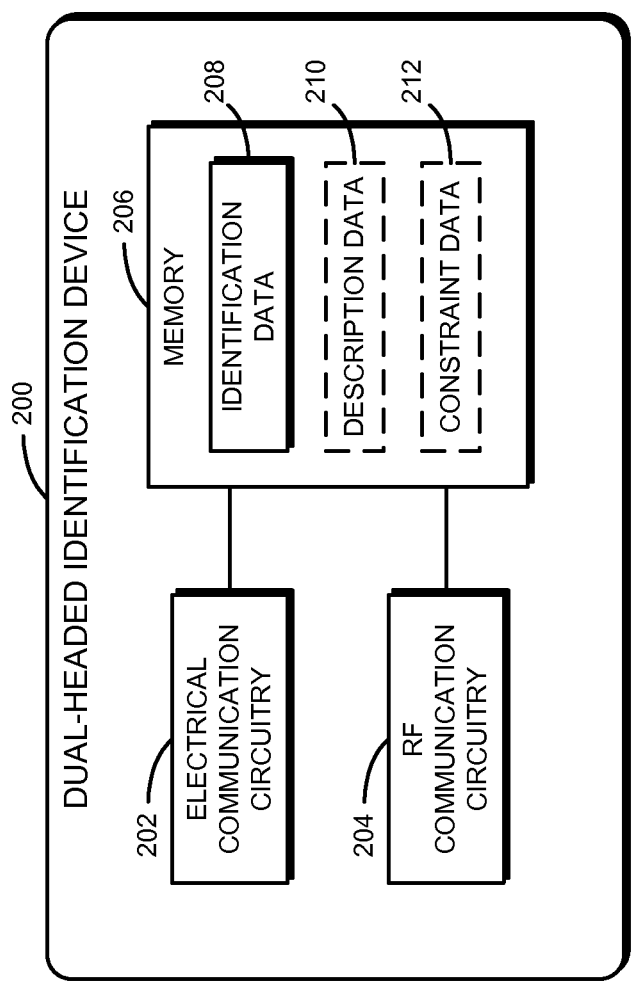
FIG. 2 is a simplified block diagram of at least one embodiment of a dual-headed identification device of the computing device of the system of FIG. 1.

In some embodiments, one or more of the DHIDs 124, 126 may be embodied as a DHID 200 as shown in FIG. 2. The illustrative DHID 200 includes an electrical communication circuitry 202, an RF communication circuitry 204, and a memory 206. The electrical communication circuitry 202 of the DHID 200 may be embodied as any communication circuitry, device, or collection thereof, capable of enabling electrical communication between the DHID 200 and other component(s) of the computing device 102 such as the primary DHID 126 (e.g., via point-to-point links, bus links, wires, cables, light guides, printed circuit board traces, etc.). In some embodiments, the electrical communication may be established by electrically coupling pins of the DHID 124, 126 to a communication bus of the computing device 102 (e.g., to an inter-integrated circuit (I2C) bus). The RF communication circuitry 204 may be embodied as any communication circuitry, device, or collection thereof, capable of enabling RF communication between the DHID 200 and other component(s) of the computing device 102 (e.g., the primary DHID 126) and/or the remote server 106. Depending on the particular embodiment, the RF communication circuitry 204 may enable the DHID 200 to communicate over any corresponding set of radio frequencies (e.g., via Near Field Communication (NFC), low frequency, high frequency, ultra high frequency, etc.). In other embodiments, the DHID 200 may be configured to communicate with other components of the computing device 102 and/or the remote server 106 using other wireless communication technology. For example, the DHID 200 may include wireless communication circuitry, in addition to or as an alternative to, the RF communication circuitry 204 to enable communication between the DHID 200 and other components of the computing device 102 and/or the remote server 106 using one or more wireless communication technologies different from RF communication. For example, in some embodiments, the wireless communication circuitry may permit the DHID 200 to communicate over Bluetooth®, Wi-Fi®, TCP/IP, and/or other wireless communication protocols. It should be appreciated that, in the illustrative embodiment, the DHID 200 may be electrically powered (e.g., by the computing device 102) and may also be RF-activated (e.g., by the remote server 106 or a primary DHID 126).

The memory 206 of the DHID 200 may be similar to the memory 114 of the computing device 102. As such, the memory 206 may be embodied as any type of volatile or non-volatile memory or data storage capable of performing the functions described herein. In the illustrative embodiment, the memory 206 includes a portion of non-volatile memory to store identification data 208 as described herein. Additionally, in some embodiments, the memory 206 may also store description data 210 and/or constraint data 212. As indicated above, the identification data 208 of the DHID 200 identifies the hardware component to which the DHID 200 is secured/associated. Depending on the particular embodiment, the identification data 208 may include a unique serial number, bar code, and/or other type of signature of the DHID 200. The description data 210 of the DHID 200 may be embodied as any data that describes the corresponding DHID 200, relationships of the DHID 200, and/or the corresponding component of the DHID 200. For example, the description data may include information regarding the DHID 200 itself (e.g., component manufacturer, data structure arrangement, cryptographic encryption, signatures, certificates, and/or hash algorithms utilized for secure communication with the DHID 200, etc.), provenance data regarding the DHID 200 or the corresponding hardware component (e.g., a log indicating where the DHID 200 or corresponding component has been, how its data was modified, etc.), and/or other descriptive information. In some embodiments, the description data 210 may be updated throughout a manufacturing supply chain to provide further contextual information. For example, in an embodiment, the identification data 208 and the description data 210 may be originally provisioned when the DHID 200 is manufactured in China and the description data 210 and/or the identification data 208 may be updated when the components are transferred to Brazil and again when the computing device 102 is assembled in Cypress. A number of benefits result from updating the provenance in such a way. For example, the system as a whole may be more secure; further, the updated description data 210 may be utilized for peripheral concerns such as, for example, tariff calculations. In other embodiments, the identification data 208, the description data 210, and/or the constraint data 212 may not be modified or deleted subsequent to the initial provisioning. The constraint data 212 of the DHID 200 may include restrictions, constraints, and/or conditions associated with the DHID 200 and/or the corresponding hardware component. For example, the DHID 200 may include restrictions, constraints, and/or conditions associated with the modification of data stored in the memory 206, geographical constraints (e.g., indicating where the computing device 102 or a particular component is authorized to operate or perform a function), temporal constraints (e.g., indicating a period during which the computing device 102 or a particular component is authorized to operate or perform a function), and/or other constraint information. In an embodiment, the computing device 102 may include hospital medical records and the constraint data 212 may include a geographical constraint that forces the computing device 102 to shut down (e.g., via an out-of-band RF-communicated instruction) if the computing device 102 leaves an authorized region (e.g., the hospital grounds).

In some embodiments, the identification data 208 of the DHID 200 may identify the corresponding component and the manufacturer of that component and may include a cryptographic hash or other signature (e.g., provisioned via field-programmable fuses (FPFs)) and/or any geographical/temporal constraints associated with the DHID 200 or the component. For example, the identification data 208 may be stored as a data structure similar to the data structure of Table 1 shown below.

TABLE 1

Data Structure for Identification Data

```
typedef struct {
    GUID ElementID;
    GUID ManufacturerID;
    GEO_CONSTRAINT Location;
    TIME_CONSTRAINT TimeLock;
    SHA512_HASH ElementFingerprint;
} PLATFORM_ELEMENT_DESCRIPTOR
```

Further, if the DHID 200 is the primary DHID 126, the identification data 208 may, additionally or alternatively, include component set identification data. The component set identification data may include a list or set of the DHIDs 124 or corresponding hardware components that should be associated with one another (e.g., to be bound to the computing device 102). In some embodiments, the component set identification data provides a "snapshot" of the components on the computing device 102 by virtue of their corresponding DHIDs 124 at the time of provisioning (or at the time of updating the identification data). For example, the component set identification data may be stored as a data structure similar to the data structure of Table 2 shown below.

TABLE 2

Data Structure for Component Set Identification Data

```
typedef struct {
    UINT64 NumberOfPlatformElements;
    PLATFORM_ELEMENT_DESCRIPTOR Elements[1];
} DEVICE_IDENTITY
```

In an illustrative embodiment, the computing device 102 may include, for example ten key components, each of which has a DHID 124 and corresponding identification data. In such an embodiment, the component set identification data may include a list, set, or arrangement of those DHIDs 124, the corresponding identification data, and/or the components. It should be appreciated that, in some embodiments, the primary DHID 126 may decommission and commission various DHIDs 124 to be included in the component set identification data and therefore be bound to the computing device 102. For example, a service technician may replace a particular component of the computing device 102 during a service call that is required to be digitally bound to the computing device 102 and the component set identification data may therefore be updated accordingly. It should be appreciated that the service technician may also utilize the component set identification data to determine whether any of the components of the computing device 102 have been modified or replaced (e.g., by the customer). If so, the technician may act accordingly, for example, by voiding the warranty covering the computing device 102.

Returning to FIG. 1, the network 104 may be embodied as any type of communication network capable of facilitating communication between the computing device 102 and remote devices (e.g., the remote server 106). As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), an ad hoc network, or any combination thereof.

The remote server 106 may be embodied as any type of computing device capable of performing the functions described herein. For example, in some embodiments, the remote server 106 is embodied as a cloud management server (e.g., a server associated with a OEM of the computing device 102). In the illustrative embodiment, the remote server 106 may communicate with the DHIDs 124 (or only the primary DHID 126) to retrieve the identification data of the components (e.g., the component set identification data) to determine, for example, whether any of the components of the computing device 102 has been modified since provisioning (or an authorized updating of the data). For example, a merchant may want to confirm that it has received the correct products by scanning the received computing devices and confirming that the received products are genuine platforms.

In some embodiments, the remote server 106 may be similar to the computing device 102 as described above. For example, the remote server 106 may be embodied as a desktop computer, server, laptop computer, notebook, netbook, ultrabook™, personal digital assistant, mobile Internet device, wearable computing device, Hybrid device, and/or any other computing/communication device. Further, the remote server 106 may include components and/or modules (see FIG. 3) similar to those of the computing device 102 discussed above. The description of those components of the computing device 102 is equally applicable to the description of components of the remote server 106 and is not repeated herein for clarity of the description. Further, it should be appreciated that the remote server 106 may include other components, sub-components, and devices commonly found in a computing device, which are not discussed above in reference to the computing device 102 and not discussed herein for clarity of the description. Additionally, in some embodiments, one or more of the components of the computing device 102 may be omitted from the remote server 106 (e.g., the DHIDs 124). It should be appreciated that, in some embodiments, a database including the information of the identification database 130 (e.g., including the component set identification data) and/or the security policies 132 may be stored on, or otherwise accessible to, the remote server 106. Although the remote server 106 is described herein as a computing device remote to the computing device 102, it should be appreciated that the remote server 106 may be in close proximity (e.g., local) to the computing device 102 in some embodiments.

Figure 3:
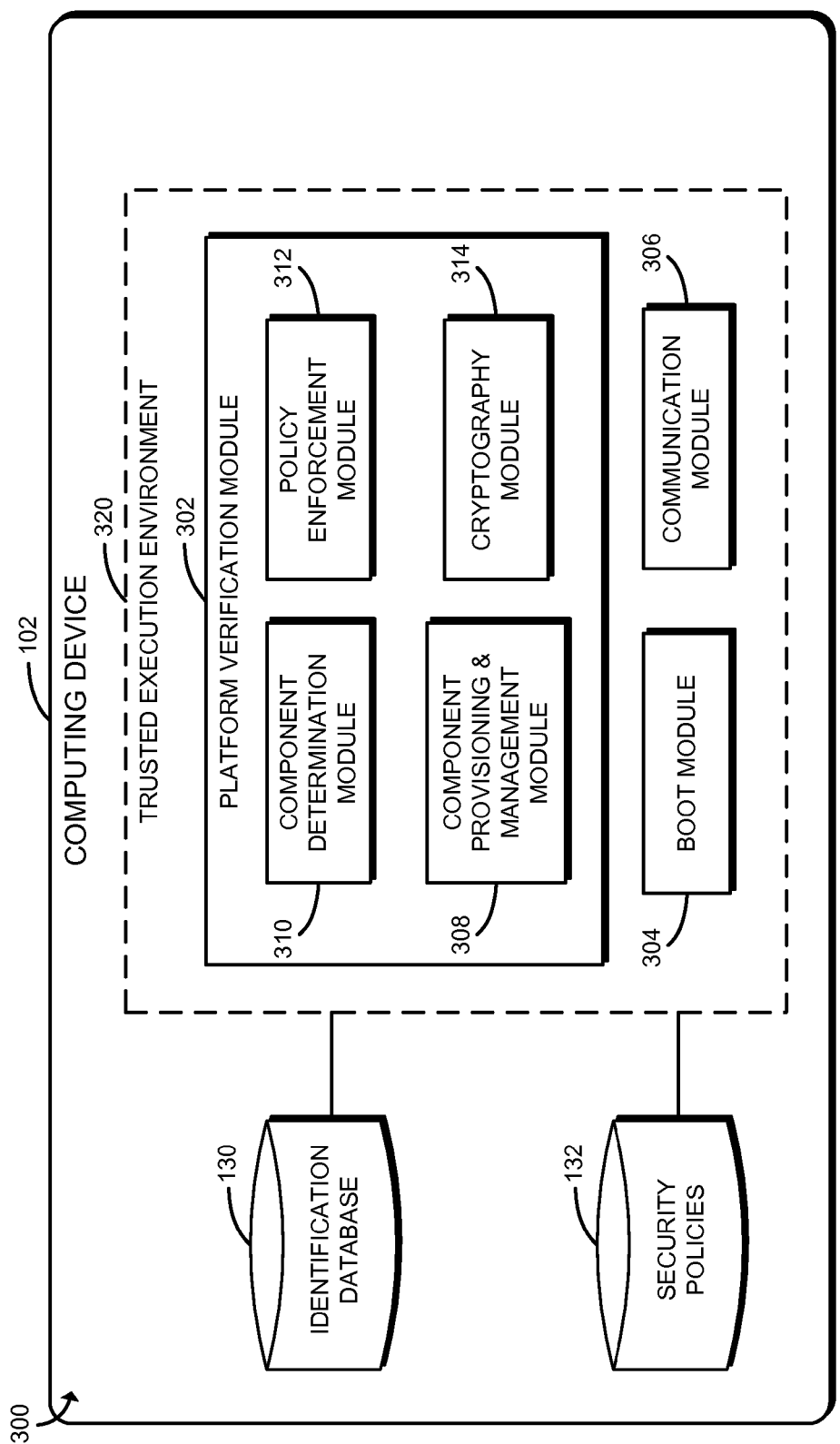
FIG. 3 is a simplified block diagram of at least one embodiment of an environment of the computing device of the system of FIG. 1.

Referring now to FIG. 3, in use, the computing device 102 establishes an environment 300 for verifying platform components of the computing device 102. The illustrative environment 300 of the computing device 102 includes a platform verification module 302, a boot module 304, and a communication module 306. Additionally, in the illustrative embodiment, the platform verification module 302 includes a component provisioning and management module 308, a component determination module 310, a policy enforcement module 312, and a cryptography module 314. Each of the modules of the environment 300 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 300 may form a portion of, or otherwise be established by, the processor 110 of the computing device 102.

In some embodiments, the computing device 102 establishes a trusted execution environment 320 for secure execution of instructions. As shown in FIG. 3, in some embodiments, the platform verification module 302, the boot module 304, and/or the communication module 306 may be executed in the trusted execution environment 320. In some embodiments, the trusted execution environment 320 may be established by the security engine 116. Further, it should be appreciated that the trusted execution environment 320 may be established as or otherwise utilize various technologies including, for example, Intel® Software Guard Extensions (SGX), Trusted Execution Engine (TEE), Trusted Platform Module (TPM), Intel® Converged Security Engine (CSE), ARM® TrustZone®, Intel® Manageability Engine, Intel® Chaabi Security Engine, and/or other techniques and mechanisms for establishing a secure and trusted execution environment. In some embodiments, the trusted execution environment 320 has access to dedicated computing and storage resources, for example, to improve resistance to malware and malicious conduct.

The platform verification module 302 is configured to determine whether one or more of the components of the computing device 102 has been modified based on the provisioned data and the platform identification data stored in the identification database 130. If so, the platform verification module 302 may perform security actions as indicated by the security policies 132. The platform verification module 302 may utilize various cryptographic techniques, for example, to ensure the data stored on the DHIDs 124 stays secure and communication between the DHIDs 124 and other components/devices is secure. In some embodiments, the platform verification module 302 may also provision various data onto the memory of the DHIDs 124 (e.g., at manufacturing). However, the DHIDs 124 may be provisioned by a separate computing device (e.g., an OEM server) in other embodiments. As indicated above, the illustrative platform verification module 302 includes the component provisioning and management module 308, the component determination module 310, the policy enforcement module 312, and the cryptography module 314.

The component provisioning and management module 308 provisions the corresponding identification data and, if any, the corresponding description data and constraint data onto the corresponding DHIDs 124 of the computing device 102. It should be appreciated that the component provisioning and management module 308 may utilize appropriate credentials (e.g., cryptographically signed, encrypted, and/or hashed by the ODM or OEM) for doing so, and such credentials may be shared with the remote server 106 in some embodiments. As indicated above, the primary DHID 126 may also be provisioned with the component set identification data based on the identification data of the DHIDs 124. Alternatively, the primary DHID 126 may query the secondary DHIDs 124 (e.g., electrically or via RF communication) to generate the component set identification data itself. In some embodiments, the component provisioning and management module 308 may update the identification data, description data, and/or constraint data of a particular DHID 124 and/or the primary DHID 126 (e.g., via RF reprogramming) at various points in time (e.g., at various points in a manufacturing supply chain).

The component determination module 310 retrieves platform identification data of the computing device 102 indicative of hardware components of the computing device 102 (e.g., from the identification database 130), accesses the identification data 208 of the DHIDs 124 of the computing device 102 identifying the corresponding components (e.g., from/with the primary DHID 126), and compares the platform identification data to the hardware component identification data to determine whether a component of the computing device 102 has been removed, replaced, or otherwise modified. As discussed above, the component determination module 310 may compare the platform identification data to the component set identification data stored on the memory 206 of the primary DHID 126 in some embodiments. It should be appreciated that, in some embodiments, the primary DHID 126 may be embodied as a separate SoC as described above. In such embodiments, the SoC may have an inter-integrated circuit (I2C) connection to each component of the computing device 102, or a sub-set thereof, such that a challenge and response can occur prior to initializing that component. As described below, the SoC may iterate through each DHID 124 and compare its identification data 208 to the platform identification data for the corresponding platform of the computing device 102 stored in the identification database 130 (e.g., using a Converged Security and Manageability Engine (CSME) super task).

The policy enforcement module 312 retrieves the security policies 132 and performs the corresponding security action in response to a determination that the retrieved platform identification data does not match the accessed identification data 208 of the DHIDs 124. In other words, the policy enforcement module 312 may perform a security action if the component determination module 310 determines that one or more components of the computing device 102 has been modified in an unauthorized manner. For example, in embodiments in which the comparison is done upon boot initialization, the policy enforcement module 312 may prevent an operating system of the computing device 102 from booting. In some circumstances, the policy enforcement module 312 may allow the operating system to launch in a secure environment. Alternatively, the policy enforcement module 312 may allow the operating system to launch but may prevent interaction with the component(s) that failed to match (e.g., locking down a peripheral device 122). In another embodiment, the policy enforcement module 312 may generate and transmit an alert message to the user of the computing device 102, the remote server 108, the manufacturer of the hardware component of the computing device 102 identified as having been modified, and/or another entity. Of course, the policy enforcement module 312 may perform other suitable security actions in other embodiments depending on the particular security policies 132.

The cryptography module 314 is configured to perform various security-related functions (e.g., attestation and cryptography). For example, in some embodiments, the cryptography module 314 may provide platform configuration register (PCR) measurements and/or other attestation quotes of the trusted execution environment 320 and/or other data. Further, the cryptography module 314 may generate a hash (e.g., a keyed hash) of various portions of the identification data 208 and compare the generated hash to a stored hash of the identification data 208. In some embodiments, the identification data 208, the description data 210, and/or the constraint data 212 may be encrypted and/or cryptographically signed when stored on the memory 206. Accordingly, in such embodiments, the cryptography module 314 utilize the corresponding cryptographic functions (e.g., decryption and/or signature verification) to access the data. Of course, the cryptography module 314 may encrypt and/or cryptographically sign various other data stored on the computing device 102.

The boot module 304 is configured to initialize a boot of the computing device 102 and/or particular components of the computing device 102. As discussed herein, in some embodiments, the computing device 102 confirms that the components of the computing device 102 have maintained their integrity upon boot of the computing device 102. The communication module 306 handles the communication between the computing device 102 and remote computing devices (e.g., the remote server 106) through the network 104. It should be appreciated that, in other embodiments, one or more of the modules described herein may be located on the remote server 106. Accordingly, in some embodiments, the remote server 106 may perform various functions described herein. For example, the remote server 106 may provision the DHIDs 124 (e.g., via RF communication) in some embodiments. In another embodiment, one or more of the DHIDs 124 may be provisioned before the corresponding components are secured to the computing device 102.

Figure 4:
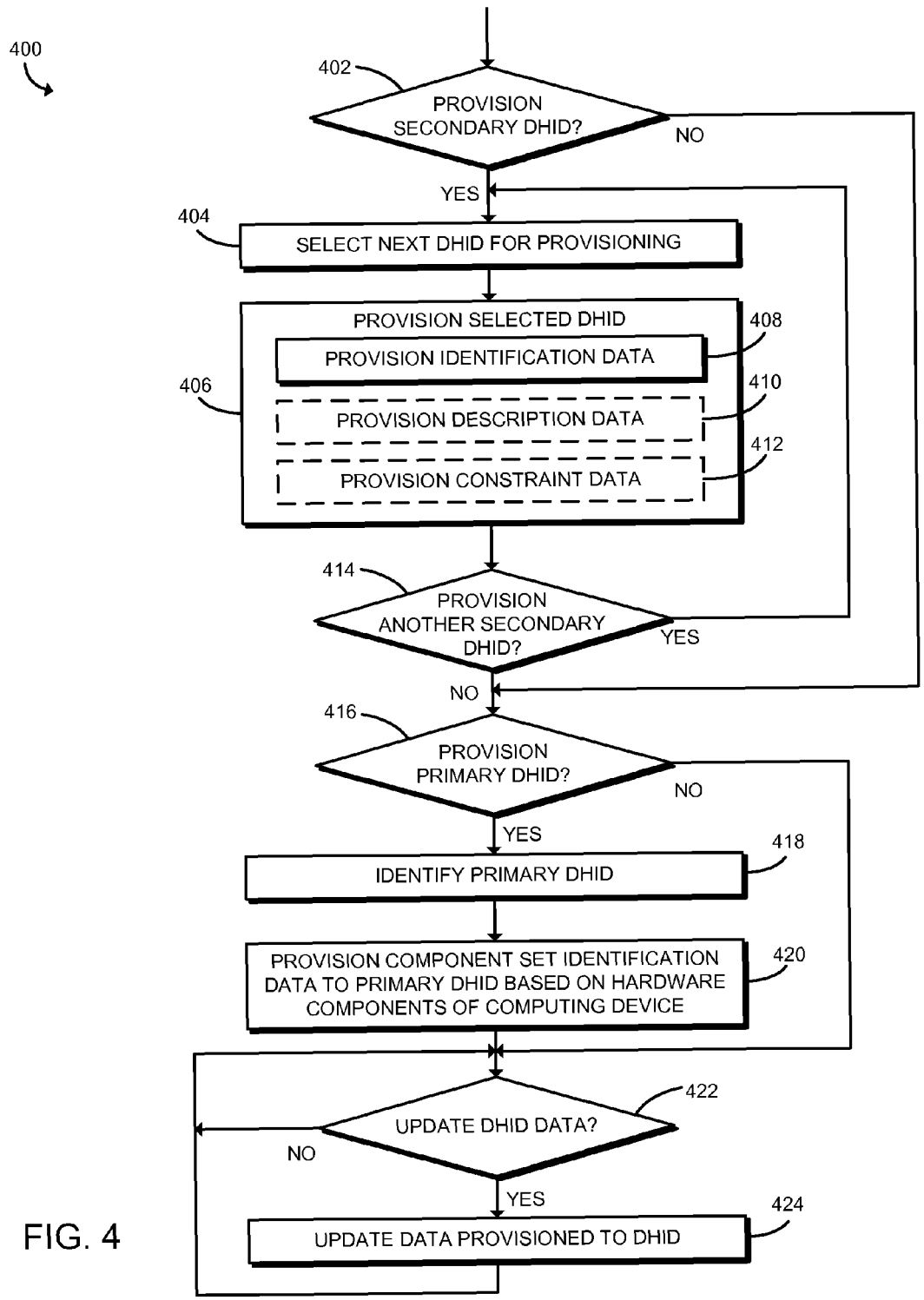
FIG. 4 is a simplified flow diagram of at least one embodiment of a method of provisioning hardware components of the computing device of the system of FIG. 1.

Referring now to FIG. 4, in use, the computing device 102 may execute a method 400 for provisioning DHIDs 124, 126 of the computing device 102. The illustrative method 400 begins with block 402 of FIG. 4 in which the computing device 102 determines whether to provision one or more DHIDs 124 of the computing device 102. For ease of description, each of the components and DHIDs 124, 126 of the computing device 102 are described herein as having already been assembled/secured to the computing device 102 and being provisioned by the computing device 102; however, as discussed above, one or more of the DHIDs 124, 126 may be provisioned prior to being assembled/secured to the hardware component or to the computing device 102 and/or may be provisioned by the remote server 106 or another entity in some embodiments.

If the computing device 102 determines to provision at least one DHID 124 of the computing device 102, the computing device 102 selects the next DHID 124 for provisioning in block 404. It should be appreciated that the component constituting the "next" DHID 124 may vary depending on the particular embodiment and may be arbitrarily selected. In the illustrative embodiment, the computing device 102 selects the next DHID 124 that is secured to a hardware component of the computing device 102. In block 406, the computing device 102 provisions data to the selected DHID 124. To do so, in block 408, the computing device 102 provisions identification data 208 to the selected DHID 124. As indicated above, the identification data 208 identifies the component and, in some embodiments, may be encrypted when stored in the memory 206 of the DHID 124. It should be appreciated that the computing device 102 may determine the identification information of the hardware component for provisioning using any suitable technique. For example, in some embodiments, an employee of the ODM or OEM may utilize a user interface to supply the identification information. In other embodiments, the DHID 124 may communicate with the component (e.g., electrically or wirelessly) to receive such identification information. In some embodiments, the computing device 102 may also provision description data 210 to the selected DHID 124 in block 410 and/or may provision constraint data 212 to the selected DHID 124 in block 412. As indicated above, the description data 210 may include data that describes the selected DHID 124, relationships of the selected DHID 124, and/or the hardware component to which the selected DHID 124 is secured. Additionally, the constraint data 212 may indicate restrictions, constraints, and/or conditions associated with the selected DHID 124 and/or the hardware component to which the selected DHID 124 is secured.

In block 414, the computing device 102 determines whether to provision another DHID 124 of the computing device 102. If so, the method 400 returns to block 404 in which the computing device 102 selects the next DHID 124 for provisioning. In the illustrative embodiment, the computing device 102 iterates through each of the DHIDs 124 secured to a hardware component of the computing device 102 and provisions each those DHIDs 124. If the computing device 102 determines not to provision any other DHIDs 124 of the computing device 102 in either of block 402 or block 414, the computing device 102 determines whether to provision the primary DHID 126 in block 416.

If the computing device 102 determines not to provision the primary DHID 126 (e.g., because it is already provisioned), the method 400 advances to block 422 in which the computing device 102 determines whether to update the data stored on one or more of the DHIDs 124, 126. However, if the computing device 102 determines to provision the primary DHID 126, the computing device 102 identifies the primary DHID 126 in block 418. It should be appreciated that the computing device 102 may identify the primary DHID 126 using any suitable techniques, algorithms, and/or mechanisms. For example, the computing device 102 may select one of the DHIDs 124 as the primary DHID 126, identify a preselected DHID 126, communicate with each of the DHIDs 124 to determine the primary DHID 126, and/or otherwise identify the primary DHID 126. As discussed above, in some embodiments, the computing device 102 may alternatively utilize a separate SoC to perform the functions of the primary DHID 126 described herein.

In block 420, the computing device 102 provisions component set identification data to the identified primary DHID 126 based on the hardware components of the computing device 102 or, more particularly, the identification data 208 of those components stored in the corresponding DHIDs 124. As described herein, the component set identification data includes a list or set of the DHIDs 124 or corresponding hardware components that should be associated with one another (e.g., to be bound to the computing device 102). In the illustrative embodiment, the component set identification data includes information identifying each of the provisioned DHIDs 124. However, in other embodiments, the component set identification data includes identification information of some (but not all) of the provisioned DHIDs 124. For example, in some embodiments, one or more of the components on which a DHID 124 is secured and provisioned may be a non-critical component, a frequently replaced component (e.g., a peripheral device 122), and/or the computing device 102 (or OEM) may determine that it is unnecessary to bind that component to the computing device 102.

In block 422, the computing device 102 determines whether to update data stored on one or more DHIDs 124, 126. If so, in block 424, the computing device 102 updates the corresponding data provisioned to the DHID 124, 126 accordingly. For example, as discussed above, the identification data 208, the description data 210, and/or the constraint data 212 may be updated at various points in time (e.g., at different points in a manufacturing supply chain, during commissioning/decommission of components, etc.) in some embodiments. Of course, in other embodiments, the data stored on the DHIDs 124, 126 may not be updated subsequent to the initial provisioning. The method 400 returns to block 422 in which the computing device 102 again determines whether to update data stored on the DHIDs 124, 126. In other words, the computing device 102 or, more particularly, the DHIDs 124, 126 may await an instruction to update the data. Of course, the DHIDs 124, 126 may interact with other components/devices in the interim.

Figure 5:
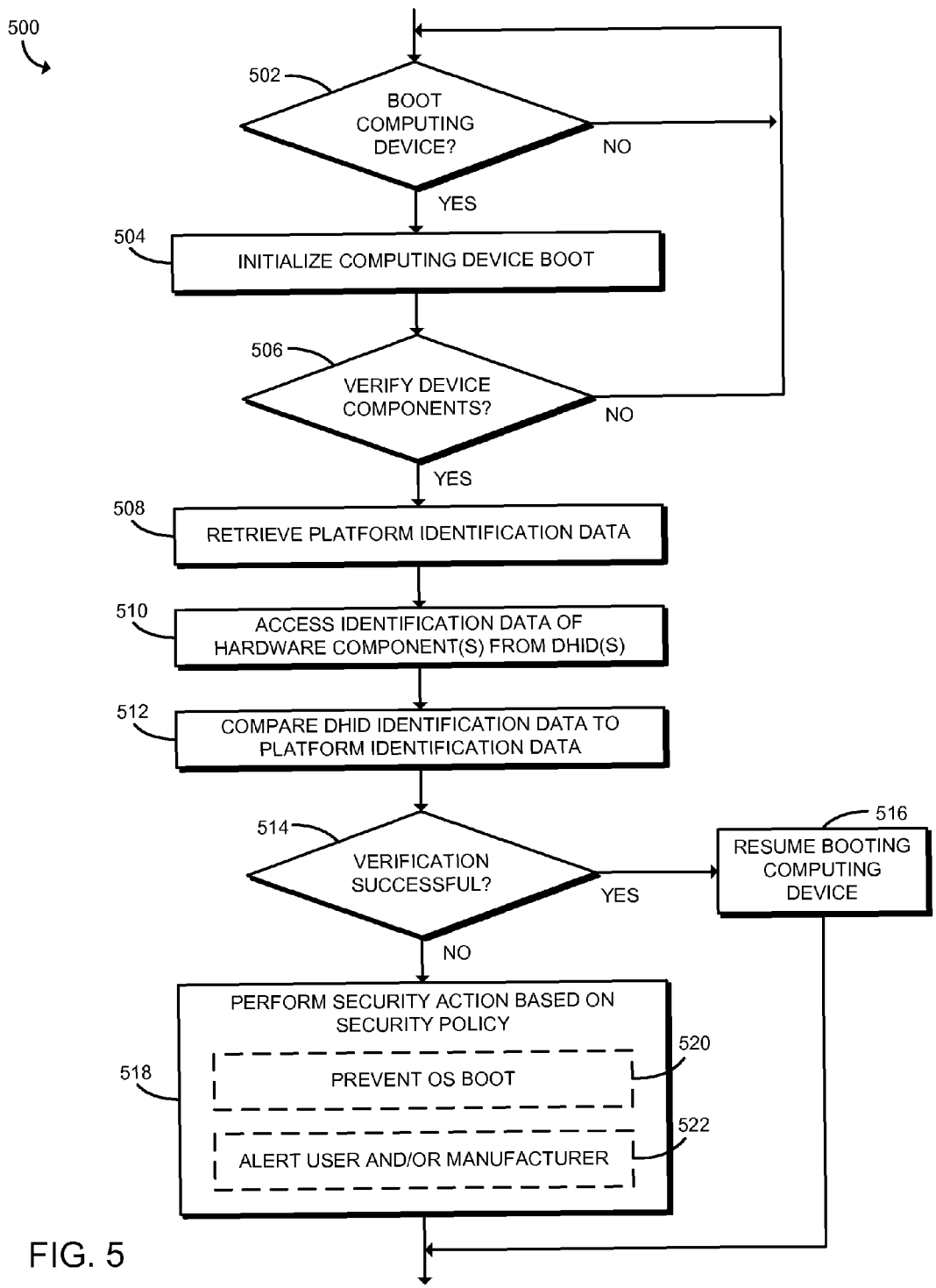
FIG. 5 is a simplified flow diagram of at least one embodiment of a method of verifying platform ingredients of the computing device of the system of FIG. 1.

Referring now to FIG. 5, in use, the computing device 102 may execute a method 500 of verifying platform components of the computing device 102. The illustrative method 500 begins with block 502 of FIG. 5 in which the computing device 102 determines whether to boot the computing device 102. If so, the computing device 102 initializes boot (i.e., begins performing its boot sequence) in block 504. In block 506, the computing device 102 determines whether to verify the components of the computing device 102. If not, the method 500 returns to block 502 in which the computing device 102 waits for its next boot initialization to determine whether to verify the device components. Of course, in other embodiments, the computing device 102 may determine to verify the components of the computing device 102 in response to other conditions (e.g., user request, application installation, during device hibernation, etc.).

If the computing device 102 determines to verify the components of the computing device 102, the computing device 102 retrieves the platform identification data from the identification database 130 in block 508. As discussed above, the platform identification data identifies the hardware components that are supposed to be included on the computing device 102. For example, the computing device 102 may retrieve platform identification data corresponding with the make, model, and/or other information that uniquely identifies the particular type/class of computing device to which the computing device 102 belongs. The computing device 102 may utilize any suitable techniques for doing so. It should be appreciated that the platform identification data is able to be compared to the component set identification data and/or the identification data 208 of the DHIDs 124 in the illustrative embodiment.

In block 510, the computing device 102 accesses the identification data 208 of the hardware components from the corresponding DHIDs 124, 126. As discussed above, in some embodiments, the primary DHID 126 (or alternative SoC) aggregates the identification data 208 of the DHID 124 into component set identification data such that the computing device 102 is able to retrieve all of the needed information from the primary DHID 126 (or alternative SoC). As discussed above, in some embodiments, the computing device 102 may access the identification data 208 and/or the component set identification data through a wired communication modality (e.g., via electrical circuitry), whereas in other embodiments, the computing device 102 may access the identification data 208 and/or the component set identification data through a wireless communication modality (e.g., via RF communication). In block 512, the computing device 102 compares the identification data 208 of the DHID 124 corresponding with the components of the computing device 102 with the retrieved platform identification data. In the illustrative embodiment, if there is a match, the computing device 102 determines that the verification is successful and none of the components including the monitored DHIDs 124 has been removed, replaced, or otherwise modified. Otherwise, the computing device 102 identifies the component that has been modified based on the comparison. For example, the identification data 208 corresponding with the modified component, if any, may differ from the corresponding data of the platform identification data. It should be appreciated that, in some embodiments, the OEM provides or utilizes a cryptographic key and/or key signature to secure the data on the DHID 124 may not be fraudulently spoofed.

In block 514, the computing device 102 determines whether the verification was successful. If so, the computing device 102 resumes booting the computing device 102 in block 516. However, if the verification was unsuccessful, the computing device performs one or more security actions based on the security policies 132 in block 518. In some embodiments, the processor 110 or another component of the computing device 102 that is connected to the DHID 124 reads the DHID 124 and takes an action if there is a mismatch, which may indicate that the component has been tampered. For example, in block 520, the computing device 102 may prevent the operating system of the computing device 102 from booting. Alternatively or additionally, in block 522, the computing device 102 may alter the user of the computing device 102, the manufacturer (e.g., the OEM)

of the computing device 102, the remote server 106, and/or another entity in block 522. In some embodiments, if verification is unsuccessful, the computing device 102 may modify, for example, a signature stored as description data 210 on the DHID 124. Further, the computing device 102 may provide a warning, prevent the computing device 102 from booting, place an error code in the description data 210 or other memory 206 of the DHID 124, and/or otherwise handle the data mismatch. It should be appreciated that, in some embodiments, the authenticity of the system may be verified by communicating with the DHICs 124 both electrically and via RF or other wireless communication.

As discussed above, in some embodiments, the remote server 106 may interact (e.g., via RF communication) with one or more of the DHIDs 124 (e.g., the primary DHID 126) to determine whether any components of the computing device 102 have been modified. In doing so, it should be appreciated that the remote server 106 may execute a method similar to the method 500 of FIG. 5. In particular, the remote server 106 may retrieve the platform identification data (e.g., from an identification database 130 stored on the remote server 106 or otherwise accessible to the remote server 106) and compare the platform identification data to the component set identification data or the individual identification data 208 of the DHIDs 124 depending on the particular embodiment. The identification data 208 and/or the component set identification data may be retrieved from the corresponding DHIDs 124 via RF communication or other wireless communication in some embodiments. If the verification is unsuccessful, the remote server 106 may perform different policy actions from the computing device 102 in some embodiments. For example, depending on the purpose of the verification check, the remote server 106 may void the warranty on the computing device 102, alert the OEM or ODM of the modification, request replacement of an unacceptable shipment of goods, and/or otherwise handle the error in a suitable manner depending on the particular context. In another embodiment, a data center or audit server may communicate with the DHIDs 124, 126 via RF communication (e.g., using an RF reader) and/or electrically over the wire (e.g., over a communication or data bus) to confirm that the computing device 102 has not been tampered with or otherwise modified.

EXAMPLES

Illustrative examples of the technologies disclosed herein are provided below. An embodiment of the technologies may include any one or more, and any combination of, the examples described below.

Example 1 includes a computing device for verifying hardware components of the computing device, the computing device comprising one or more dual-headed identification devices, wherein each of the one or more dual-headed identification devices is secured to a corresponding hardware component and includes (i) hardware component identification data indicative of an identity of the corresponding hardware component, (ii) a wired communication circuit, and (iii) a wireless communication circuit; and a platform verification module to (i) retrieve platform identification data of the computing device indicative of one or more reference hardware components of the computing device, (ii) access the hardware component identification data of the one or more dual-headed identification devices, and (iii) compare the platform identification data to the hardware component identification data to determine whether a hardware component of the computing device has been modified.

Example 2 includes the subject matter of Example 1, and further including a boot module to initialize a boot of the computing device, wherein to compare the platform identification data to the hardware component identification data comprises to compare the platform identification data to the hardware component identification data in response to the boot initialization.

Example 3 includes the subject matter of any of Examples 1 and 2, and wherein the platform verification module is further to perform a security action in response to a determination that a hardware component of the computing device has been modified.

Example 4 includes the subject matter of any of Examples 1-3, and wherein to perform the security action comprises to prevent an operating system of the computing device from booting.

Example 5 includes the subject matter of any of Examples 1-4, and wherein to perform the security action comprises to generate an alert message.

Example 6 includes the subject matter of any of Examples 1-5, and wherein to perform the security action comprises to transmit the alert message to a manufacturer of the hardware component of the computing device identified as having been modified.

Example 7 includes the subject matter of any of Examples 1-6, and wherein the platform verification module is further to provision the identification data to the corresponding one or more dual-headed identification devices of the computing device.

Example 8 includes the subject matter of any of Examples 1-7, and wherein to provision the identification data further comprises to provision at least one of description data or constraint data to the corresponding one or more dual-headed identification devices, wherein the description data describes at least one of the corresponding dual-headed identification device, a relationship of the corresponding dual-headed identification device, or the corresponding hardware component of the corresponding dual-headed identification devices, and wherein the constraint data indicates at least one of a restriction, a constraint, or a condition associated with the corresponding dual-headed identification device.

Example 9 includes the subject matter of any of Examples 1-8, and wherein the platform verification module is further to update at least one of the identification data, the description data, or the constraint data corresponding to a dual-headed identification device.

Example 10 includes the subject matter of any of Examples 1-9, and wherein to update the description data of the dual-headed identification device comprises to maintain provenance data of the dual-headed identification device.

Example 11 includes the subject matter of any of Examples 1-10, and wherein the constraint data is indicative of one or more of a geographical constraint or a temporal constraint of a dual-headed identification device.

Example 12 includes the subject matter of any of Examples 1-11, and wherein the geographical constraint identifies a geographical boundary within which the computing device is authorized to perform a function.

Example 13 includes the subject matter of any of Examples 1-12, and wherein the temporal constraint identifies a period of time during which the computing device is authorized to perform a function.

Example 14 includes the subject matter of any of Examples 1-13, and wherein the platform verification module is further to identify a primary dual-headed identification device from the one or more dual-headed identification devices; and provision component set identification data to the primary dual-headed identification device based on the provisioned one or more dual-headed identification devices of the computing device, wherein the component set identification data is indicative of hardware components on the computing device at the time of provisioning of the primary dual-headed identification device.

Example 15 includes the subject matter of any of Examples 1-14, and wherein to provision the component set identification data to the primary dual-headed identification device comprises to retrieve the identification data of the one or more dual-headed identification devices; and bind the identification data of the one or more dual-headed identification devices to the computing device.

Example 16 includes the subject matter of any of Examples 1-15, and wherein to access the hardware component identification data comprises to access the component set identification data from the primary dual-headed identification device.

Example 17 includes the subject matter of any of Examples 1-16, and wherein the wireless communication circuit comprises a radio frequency communication circuit.

Example 18 includes the subject matter of any of Examples 1-17, and wherein the radio frequency communication circuit comprises a radio frequency identification circuit.

Example 19 includes the subject matter of any of Examples 1-18, and further including a motherboard, wherein the wired communication circuit of each of the one or more dual-headed identification devices includes a corresponding pin electrically coupled to the motherboard.

Example 20 includes the subject matter of any of Examples 1-19, and further including a dedicated communication bus to communicate the hardware component identification data, wherein the wired communication circuit is electrically coupled to the dedicated communication bus.

Example 21 includes a method for verifying hardware components of a computing device, the method comprising retrieving platform identification data of the computing device, the platform identification data indicative of one or more reference hardware components of the computing device; accessing hardware component identification data from one or more dual-headed identification devices, wherein each of the one or more dual-headed identification devices is secured to a corresponding hardware component of the computing device and (i) includes identification data indicative of an identity of the corresponding hardware component of the computing device and (ii) is capable of wired and wireless communication; and comparing the platform identification data to the hardware component identification data to determine whether a hardware component of the computing device has been modified.

Example 22 includes the subject matter of Example 21, and wherein retrieving the platform identification data comprises retrieving the platform identification data by the computing device; accessing the hardware component identification data comprises accessing the hardware component identification data by the computing device; and comparing the platform identification data to the hardware component identification data comprises comparing the platform identification data to the hardware component identification data by the computing device.

Example 23 includes the subject matter of any of Examples 21 and 22, and wherein retrieving the platform identification data comprises retrieving the platform identification data by a remote server; accessing the hardware component identification data comprises receiving the hardware component identification data by the remote server and from the computing device; and comparing the platform identification data to the hardware component identification data comprises comparing the platform identification data to the hardware component identification data by the remote server.

Example 24 includes the subject matter of any of Examples 21-23, and wherein accessing the hardware component identification data comprises receiving, by the remote server and from the computing device, the hardware component identification data with radio frequency communication.

Example 25 includes the subject matter of any of Examples 21-24, and further including initializing a boot of the computing device, wherein comparing the platform identification data to the hardware component identification data comprises comparing the platform identification data to the hardware component identification data in response to the boot initialization.

Example 26 includes the subject matter of any of Examples 21-25, and further including performing a security action in response to determining that a hardware component of the computing device has been modified.

Example 27 includes the subject matter of any of Examples 21-26, and wherein performing the security action comprises preventing an operating system of the computing device from booting.

Example 28 includes the subject matter of any of Examples 21-27, and wherein performing the security action comprises generating an alert message.

Example 29 includes the subject matter of any of Examples 21-28, and wherein performing the security action comprises transmitting the alert message to a manufacturer of the hardware component of the computing device identified as having been modified.

Example 30 includes the subject matter of any of Examples 21-29, and further including provisioning the identification data to the corresponding one or more dual-headed identification devices of the computing device.

Example 31 includes the subject matter of any of Examples 21-30, and wherein provisioning the identification data further comprises provisioning at least one of description data or constraint data to the corresponding one or more dual-headed identification devices, wherein the description data describes at least one of the corresponding dual-headed identification device, a relationship of the corresponding dual-headed identification device, or the corresponding hardware component of the corresponding dual-headed identification devices, and wherein the constraint data indicates at least one of a restriction, a constraint, or a condition associated with the corresponding dual-headed identification device.

Example 32 includes the subject matter of any of Examples 21-31, and further including updating at least one of the identification data, the description data, or the constraint data corresponding to a dual-headed identification device.

Example 33 includes the subject matter of any of Examples 21-32, and wherein updating the description data of the dual-headed identification device comprises maintaining provenance data of the dual-headed identification device.

Example 34 includes the subject matter of any of Examples 21-33, and wherein the constraint data is indicative of one or more of a geographical constraint or a temporal constraint of a dual-headed identification device.

Example 35 includes the subject matter of any of Examples 21-34, and wherein the geographical constraint identifies a geographical boundary within which the computing device is authorized to perform a function.

Example 36 includes the subject matter of any of Examples 21-35, and wherein the temporal constraint identifies a period of time during which the computing device is authorized to perform a function.

Example 37 includes the subject matter of any of Examples 21-36, and further including identifying a primary dual-headed identification device from the one or more dual-headed identification devices; and provisioning component set identification data to the primary dual-headed identification device based on the provisioned one or more dual-headed identification devices of the computing device, wherein the component set identification data is indicative of hardware components on the computing device at the time of provisioning of the primary dual-headed identification device.

Example 38 includes the subject matter of any of Examples 21-37, and wherein provisioning the component set identification data to the primary dual-headed identification device comprises retrieving the identification data of the one or more dual-headed identification devices; and binding the identification data of the one or more dual-headed identification devices to the computing device.

Example 39 includes the subject matter of any of Examples 21-38, and wherein accessing the hardware component identification data comprises accessing the component set identification data from the primary dual-headed identification device.

Example 40 includes a computing device comprising a processor; and a memory having stored therein a plurality of instructions that when executed by the processor cause the computing device to perform the method of any of Examples 21-39.

Example 41 includes one or more machine-readable storage media comprising a plurality of instructions stored thereon that, in response to execution by a computing device, cause the computing device to perform the method of any of Examples 21-39.

Example 42 includes a computing device for verifying hardware components of the computing device, the computing device comprising means for retrieving platform identification data of the computing device, the platform identification data indicative of one or more reference hardware components of the computing device; means for accessing hardware component identification data from one or more dual-headed identification devices, wherein each of the one or more dual-headed identification devices is secured to a corresponding hardware component of the computing device and (i) includes identification data indicative of an identity of the corresponding hardware component of the computing device and (ii) is capable of wired and wireless communication; and means for comparing the platform identification data to the hardware component identification data to determine whether a hardware component of the computing device has been modified.

Example 43 includes the subject matter of Example 42, and wherein the means for retrieving the platform identification data comprises means for retrieving the platform identification data by the computing device; the means for accessing the hardware component identification data comprises means for accessing the hardware component identification data by the computing device; and the means for comparing the platform identification data to the hardware component identification data comprises means for comparing the platform identification data to the hardware component identification data by the computing device.

Example 44 includes the subject matter of any of Examples 42 and 43, and wherein the means for retrieving the platform identification data comprises means for retrieving the platform identification data by a remote server; the means for accessing the hardware component identification data comprises means for receiving the hardware component identification data by the remote server; and the means for comparing the platform identification data to the hardware component identification data comprises means for comparing the platform identification data to the hardware component identification data by the remote server.

Example 45 includes the subject matter of any of Examples 42-44, and wherein the means for accessing the hardware component identification data comprises means for receiving, by the remote server, the hardware component identification data with radio frequency communication.

Example 46 includes the subject matter of any of Examples 42-45, and further including means for initializing a boot of the computing device, wherein the means for comparing the platform identification data to the hardware component identification data comprises means for comparing the platform identification data to the hardware component identification data in response to the boot initialization.

Example 47 includes the subject matter of any of Examples 42-46, and further including means for performing a security action in response to determining that a hardware component of the computing device has been modified.

Example 48 includes the subject matter of any of Examples 42-47, and wherein the means for performing the security action comprises means for preventing an operating system of the computing device from booting.

Example 49 includes the subject matter of any of Examples 42-48, and wherein the means for performing the security action comprises means for generating an alert message.

Example 50 includes the subject matter of any of Examples 42-49, and wherein the means for performing the security action comprises means for transmitting the alert message to a manufacturer of the hardware component of the computing device identified as having been modified.

Example 51 includes the subject matter of any of Examples 42-50, and further including means for provisioning the identification data to the corresponding one or more dual-headed identification devices of the computing device.

Example 52 includes the subject matter of any of Examples 42-51, and wherein the means for provisioning the identification data further comprises means for provisioning at least one of description data or constraint data to the corresponding one or more dual-headed identification devices, wherein the description data describes at least one of the corresponding dual-headed identification device, a relationship of the corresponding dual-headed identification device, or the corresponding hardware component of the corresponding dual-headed identification devices, and wherein the constraint data indicates at least one of a restriction, a constraint, or a condition associated with the corresponding dual-headed identification device.

Example 53 includes the subject matter of any of Examples 42-52, and further including means for updating at least one of the identification data, the description data, or the constraint data corresponding to a dual-headed identification device.

Example 54 includes the subject matter of any of Examples 42-53, and wherein the means for updating the description data of the dual-headed identification device comprises means for maintaining provenance data of the dual-headed identification device.

Example 55 includes the subject matter of any of Examples 42-54, and wherein the constraint data is indicative of one or more of a geographical constraint or a temporal constraint of a dual-headed identification device.

Example 56 includes the subject matter of any of Examples 42-55, and wherein the geographical constraint identifies a geographical boundary within which the computing device is authorized to perform a function.

Example 57 includes the subject matter of any of Examples 42-56, and wherein the temporal constraint identifies a period of time during which the computing device is authorized to perform a function.

Example 58 includes the subject matter of any of Examples 42-57, and further including means for identifying a primary dual-headed identification device from the one or more dual-headed identification devices; and means for provisioning component set identification data to the primary dual-headed identification device based on the provisioned one or more dual-headed identification devices of the computing device, wherein the component set identification data is indicative of hardware components on the computing device at the time of provisioning of the primary dual-headed identification device.

Example 59 includes the subject matter of any of Examples 42-58, and wherein the means for provisioning the component set identification data to the primary dual-headed identification device comprises means for retrieving the identification data of the one or more dual-headed identification devices; and means for binding the identification data of the one or more dual-headed identification devices to the computing device.

Example 60 includes the subject matter of any of Examples 42-59, and wherein the means for accessing the hardware component identification data comprises means for accessing the component set identification data from the primary dual-headed identification device.

The invention claimed is:

1. A computing device for verifying hardware components of the computing device, the computing device comprising:
one or more dual-headed identification devices, wherein each of the one or more dual-headed identification devices is secured to a corresponding hardware component and includes (i) hardware component identification data indicative of an identity of the corresponding hardware component, (ii) a wired communication circuit, and (iii) a wireless communication circuit; and
a processor to establish a platform verification module to (i) retrieve platform identification data of the computing device indicative of one or more reference hardware components of the computing device, (ii) identify one of the dual-headed identification devices as a primary dual-headed identification device, (iii) receive, from the identified primary dual-headed identification device, component set identification data that includes hardware component identification data of one or more secondary dual-headed identification devices different from the primary dual-headed identification device, and (iv) compare the platform identification data to the hardware component identification data in the component set identification data to determine whether a hardware component of the computing device has been modified.

2. The computing device of claim 1, further comprising a boot module to initialize a boot of the computing device, wherein to compare the platform identification data to the hardware component identification data comprises to compare the platform identification data to the hardware component identification data in response to the boot initialization.

3. The computing device of claim 1, wherein the platform verification module is further to perform a security action in response to a determination that a hardware component of the computing device has been modified.

4. The computing device of claim 3, wherein to perform the security action comprises to prevent an operating system of the computing device from booting.

5. The computing device of claim 3, wherein to perform the security action comprises to:
generate an alert message; and
transmit the alert message to a manufacturer of the hardware component of the computing device identified as having been modified.

6. The computing device of claim 1, wherein the platform verification module is further to provision the hardware component identification data to the corresponding one or more dual-headed identification devices of the computing device.

7. The computing device of claim 6, wherein to provision the hardware component identification data further comprises to provision at least one of description data or constraint data to the corresponding one or more dual-headed identification devices,
wherein the description data describes at least one of the corresponding dual-headed identification device, a relationship of the corresponding dual-headed identification device, or the corresponding hardware component of the corresponding dual-headed identification devices, and
wherein the constraint data indicates at least one of a restriction, a constraint, or a condition associated with the corresponding dual-headed identification device.

8. The computing device of claim 7, wherein the platform verification module is further to update at least one of the hardware component identification data, the description data, or the constraint data corresponding to a dual-headed identification device.

9. The computing device of claim 6, wherein to provision the hardware component identification data comprises to maintain provenance data of the dual-headed identification device.

10. The computing device of claim 6, wherein to provision the hardware component identification data comprises to provision constraint data that is indicative of one or more of a geographical constraint or a temporal constraint of a dual-headed identification device.

11. The computing device of claim 10, wherein the geographical constraint identifies a geographical boundary within which the computing device is authorized to perform a function.

12. The computing device of claim 10, wherein the temporal constraint identifies a period of time during which the computing device is authorized to perform a function.

13. The computing device of claim 6, wherein the platform verification module is further to:
provision the component set identification data to the primary dual-headed identification device based on the provisioned one or more dual-headed identification devices of the computing device, wherein the component set identification data is indicative of hardware components on the computing device at the time of provisioning of the primary dual-headed identification device.

14. The computing device of claim 13, wherein to provision the component set identification data to the primary dual-headed identification device comprises to (i) retrieve the hardware component identification data of the one or more dual-headed identification devices and (ii) bind the hardware component identification data of the one or more dual-headed identification devices to the computing device.

15. One or more non-transitory machine-readable storage media comprising a plurality of instructions stored thereon that, in response to execution by a first computing device, cause the first computing device to:
retrieve platform identification data of a second computing device, the platform identification data indicative of one or more reference hardware components of the second computing device;
identify one of a plurality of dual-headed identification devices in the second computing device as a primary dual-headed identification device;
receive, from the identified primary dual-headed identification device, component set identification data that includes hardware component identification data of one or more secondary dual-headed identification devices different from the primary dual-headed identification device wherein each of the dual-headed identification devices is secured to a corresponding hardware component of the second computing device and (i) includes identification data indicative of an identity of the corresponding hardware component of the second computing device and (ii) is capable of wired and wireless communication; and
compare the platform identification data to the hardware component identification data in the component set identification data to determine whether a hardware component of the second computing device has been modified.

16. The one or more non-transitory machine-readable storage media of claim 15, wherein the first computing device and the second computing device are a same computing device.

17. The one or more non-transitory machine-readable storage media of claim 15, wherein the plurality of instructions further cause the first computing device to initialize a boot of the second computing device, wherein to compare the platform identification data to the hardware component identification data comprises to compare the platform identification data to the hardware component identification data in response to the boot initialization.

18. The one or more non-transitory machine-readable storage media of claim 15, wherein the plurality of instructions further cause the first computing device to provision the identification data to the corresponding one or more dual-headed identification devices of the second computing device.

19. The one or more non-transitory machine-readable storage media of claim 18, wherein the plurality of instructions further cause the first computing device to:
provision the component set identification data to the primary dual-headed identification device based on the provisioned one or more dual-headed identification devices of the second computing device, wherein the component set identification data is indicative of hardware components on the second computing device at the time of provisioning of the primary dual-headed identification device.

20. The one or more non-transitory machine-readable storage media of claim 19, wherein to provision the component set identification data to the primary dual-headed identification device comprises to (i) retrieve the identification data of the one or more dual-headed identification devices and (ii) bind the identification data of the one or more dual-headed identification devices to the second computing device.

21. A method for verifying hardware components of a computing device, the method comprising:
retrieving platform identification data of the computing device, the platform identification data indicative of one or more reference hardware components of the computing device;
identifying one of a plurality of dual-headed identification devices in the computing device as a primary dual-headed identification device;
receiving, from the identified primary dual-headed identification device, component set identification data that includes hardware component identification data of one or more secondary dual-headed identification devices different from the primary dual-headed identification device, wherein each of the dual-headed identification devices is secured to a corresponding hardware component of the computing device and (i) includes identification data indicative of an identity of the corresponding hardware component of the computing device and (ii) is capable of wired and wireless communication; and
comparing the platform identification data to the hardware component identification data in the component set identification data to determine whether a hardware component of the computing device has been modified.

22. The method of claim 21, wherein:
retrieving the platform identification data comprises retrieving the platform identification data by a remote server;
receiving the component set identification data comprises receiving the component set identification data by the remote server and from the computing device; and
comparing the platform identification data to the hardware component identification data comprises comparing the platform identification data to the hardware component identification data by the remote server.

23. The computing device of claim 1, wherein the primary dual-headed identification device is a system-on-a-chip (SOC).

24. The computing device of claim 1, wherein the wired communication circuit is to communicate electrically when the corresponding hardware component is powered by the computing device and the wireless communication circuit is to communicate when the corresponding hardware component is unpowered.

25. The computing device of claim 1, wherein the primary dual-headed identification device is to selectively commission or decommission one or more of the secondary dual-headed identification devices.

* * * * *